(12) United States Patent
Moriai et al.

(10) Patent No.: US 12,164,360 B2
(45) Date of Patent: Dec. 10, 2024

(54) VEHICULAR ADVERTISEMENT DISPLAY DEVICE AND VEHICLE

(71) Applicant: TOYOTA JIDOSHA KABUSHIKI KAISHA, Aichi-ken (JP)

(72) Inventors: Takeo Moriai, Nagakute (JP); Masakazu Setoyama, Miyoshi (JP); Teruo Mori, Ichinomiya (JP); Takanobu Hirakoshi, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 41 days.

(21) Appl. No.: 18/159,089

(22) Filed: Jan. 25, 2023

(65) Prior Publication Data

US 2023/0280818 A1 Sep. 7, 2023

(30) Foreign Application Priority Data

Mar. 1, 2022 (JP) ................................. 2022-031047

(51) Int. Cl.
*G06F 1/3234* (2019.01)
*G09F 21/04* (2006.01)

(52) U.S. Cl.
CPC .......... *G06F 1/3265* (2013.01); *G09F 21/048* (2013.01)

(58) Field of Classification Search
CPC ... G06F 1/3265; G06F 21/048; G06F 21/0485
See application file for complete search history.

(56) References Cited

U.S. PATENT DOCUMENTS

| 2001/0028393 | A1* | 10/2001 | Tomida ..................... B60R 1/25 |
| | | | 348/148 |
| 2018/0186311 | A1* | 7/2018 | Mason ..................... H04W 4/44 |
| 2020/0134673 | A1 | 4/2020 | Takemura et al. |
| 2021/0233115 | A1* | 7/2021 | Kardesler .............. G06V 40/10 |
| 2022/0396202 | A1* | 12/2022 | Tsukamoto ............. G09F 21/00 |

FOREIGN PATENT DOCUMENTS

| CN | 110379348 A | * 10/2019 | |
| CN | 114880033 B | * 11/2023 | ........... G06F 9/4418 |
| JP | 202067560 A | 4/2020 | |

* cited by examiner

*Primary Examiner* — Hyun Soo Kim
(74) *Attorney, Agent, or Firm* — HAUPTMAN HAM, LLP (57) ABSTRACT

The vehicular advertisement display device includes a processor. The processor is configured to display advertisement information on a display unit provided on an outer surface of the vehicle main body. The processor is also configured to reduce power consumption of the vehicle based on the vehicle state.

5 Claims, 6 Drawing Sheets

VEHICULAR ADVERTISEMENT DISPLAY DEVICE AND VEHICLE

CROSS-REFERENCE TO RELATED APPLICATION

This application claims priority to Japanese Patent Application No. 2022-031047 filed on Mar. 1, 2022, incorporated herein by reference in its entirety.

BACKGROUND

1. Technical Field

The present disclosure relates to a vehicular advertisement display device and a vehicle.

2. Description of Related Art

Japanese Unexamined Patent Application Publication No. 2020-67560 (JP 2020-67560 A) discloses an information processing device that acquires a traveling state of a vehicle and that determines an amount of information of an advertisement to be output based on the acquired traveling state. Specifically, the information processing device described in JP 2020-67560 A has a configuration in which a simple advertisement is posted when a vehicle speed is high and a complicated advertisement is posted when the vehicle is waiting for traffic lights to change.

SUMMARY

In a vehicle that displays advertisement information on a display unit provided on an outer surface of a vehicle main body, a power consumption amount increases in association with the display of advertisement information. In the information processing device described in JP 2020-67560 A, the power consumption associated with displaying the advertisement information is not taken into consideration, and there is room for improvement in increasing a cruising distance of the vehicle.

An object of the present disclosure is to provide a vehicular advertisement display device and a vehicle capable of increasing a cruising distance of the vehicle displaying an advertisement.

A vehicular advertisement display device according to a first aspect of the present disclosure includes a processor. The processor is configured to display advertisement information on a display unit provided on an outer surface of a vehicle main body, and reduce power consumption of a vehicle based on a vehicle state.

According to this configuration, the advertisement information is displayed on the display unit provided on the outer surface of the vehicle main body and thus, the advertisement can be visually recognized by a person around the vehicle. In addition, since the processor reduces the power consumption of the vehicle based on the vehicle state, the vehicle can be driven for a longer time as compared with a configuration in which the power consumption is not taken into consideration. Here, the "vehicle state" is not limited to the state of the vehicle itself such as a vehicle speed, a vehicle cabin temperature, and a remaining amount of fuel, and is a concept broadly including a setting value set by a user such as information of a destination. Further, the "vehicle state" includes an external force acting on the vehicle such as the number of occupants and a load amount of a cargo.

In the vehicular advertisement display device according to the first aspect, the processor reduces power consumption related to display of the advertisement information when a vehicle speed serving as the vehicle state is higher than a predetermined speed.

According to such a configuration, when the vehicle speed is higher than the predetermined speed, the processor reduces power consumption related to displaying the advertisement information. When the vehicle speed is high, since a person around the vehicle cannot watch the advertisement information, there is a high possibility that the effect of displaying the advertisement information cannot be sufficiently obtained. Therefore, by reducing the power consumption related to displaying the advertisement information when the vehicle speed is high, the electric power used for the display of the advertisement information can be used for traveling of the vehicle.

In the vehicular advertisement display device according to the first aspect, the processor reduces power consumption related to display of the advertisement information when a distance to a destination set as the vehicle state is longer than a predetermined distance.

According to such a configuration, the processor reduces power consumption when the distance to the destination is longer than the predetermined distance. Therefore, it is possible to suppress the vehicle from running out of fuel by the time the vehicle reaches the destination.

A vehicle according to a second aspect of the disclosure includes: a vehicle main body provided with a display unit on an outer surface; and the vehicular advertisement display device according to any one of claims 1 to 3.

According to such a configuration, in the vehicle, the effects described in claims 1 to 3 can be obtained.

In the vehicle according to the second aspect, the vehicle main body includes a plurality of the display units on the outer surface, and the processor reduces power consumption by temporarily stopping display of the advertisement information on some of the display units among the display units based on a vehicle state.

According to such a configuration, the processor temporarily stops displaying the advertisement information on some of the display units among the plurality of display units and thus, the processor can reduce the power consumption related to displaying the advertisement information only while the display is stopped.

In the vehicle according to the second aspect, the vehicle main body includes a plurality of the display units on the outer surface, and the processor reduces power consumption by temporarily decreasing a luminance of display of the advertisement information in some of the display units among the display units based on a vehicle state.

According to such a configuration, the processor temporarily decreases the luminance of display of the advertisement information in some of the display units among the plurality of display units and thus, the processor can reduce the power consumption related to displaying the advertisement information only while the luminance is decreased. Further, since displaying the advertisement information is not stopped, it is possible to reduce the power consumption while the advertisement is displayed.

As described above, according to the vehicular advertisement display device and the vehicle of the present disclosure, it is possible to extend the cruising distance of the vehicle displaying the advertisement.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
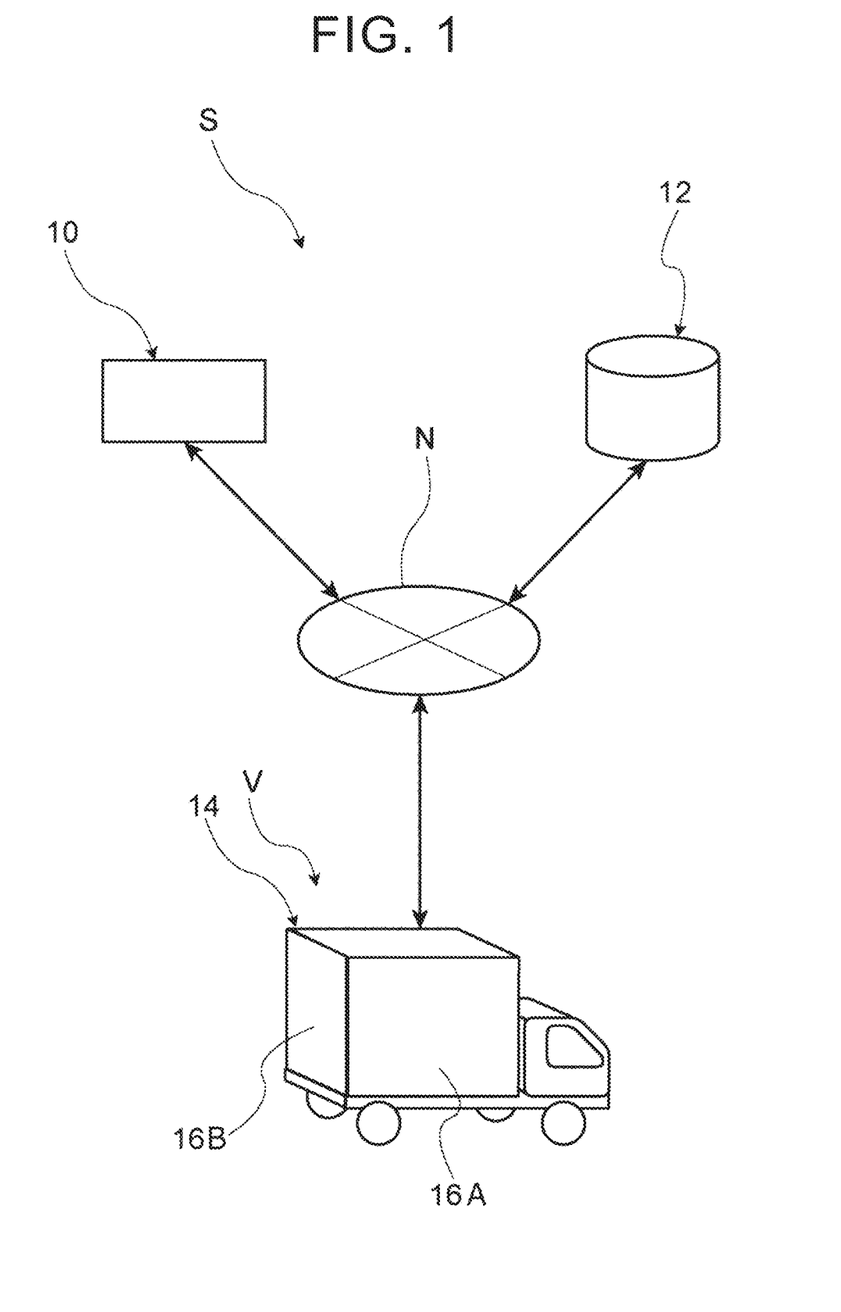
FIG. 1 is a schematic diagram illustrating an overall configuration of a system according to an embodiment.

A system S including the vehicular advertisement display device 10 according to the embodiment will be described with reference to the drawings.
Overall Structure As illustrated in FIG. 1, the system S includes a vehicular advertisement display device 10, a server 12, and a vehicle V. In addition, the vehicular advertisement display device 10, the server 12, and the vehicle V can communicate with each other via the network N. Although one vehicle V is illustrated as an example in FIG. 1, the number of vehicles V is not limited to one, and the system S may be configured to include a plurality of vehicles V.

A storage area (not shown) is provided in the server 12, and data of advertisement information for display on the vehicle V and the like are stored in the storage area. In addition, data output from the vehicular advertisement display device 10 is stored in the storage area of the server 12. Further, data output from the vehicle V is stored in the storage area of the server 12. For example, information on the vehicle state of the vehicle V, the display time of the advertisement information, the display content of the advertisement information, and the like are stored in the storage area of the server 12.

A side surface display unit 16A and a back surface display unit 16B are provided on an outer surface of the vehicle main body 14 of the vehicle V. The side surface display unit 16A is provided on both sides of the vehicle main body 14 in the vehicle widthwise direction, and is a display area capable of displaying advertisement information. Further, the back surface display unit 16B is provided on a rear surface of the vehicle main body 14 in the vehicle front-rear direction, and is a display area capable of displaying advertisement information.

When receiving a message indicating that an advertisement is to be displayed from the vehicular advertisement display device 10, the vehicle V causes at least one of the side surface display unit 16A and the back surface display unit 16B to display predetermined advertisement information. In the present embodiment, the advertisement information acquired from the server 12 is displayed as an example, but the advertisement information to be displayed is not limited thereto. When the advertisement information is previously stored in the storage unit of the vehicle V, the vehicle V may cause the stored advertisement information to be displayed on at least one of the side surface display unit 16A and the back surface display unit 16B.

The system S is configured as described above, and the vehicular advertisement display device 10 according to the present embodiment is configured to reduce the power consumption of the vehicle V based on the vehicle state.
(Hardware Configuration of Vehicular Advertisement Display Device 10)

Figure 2:
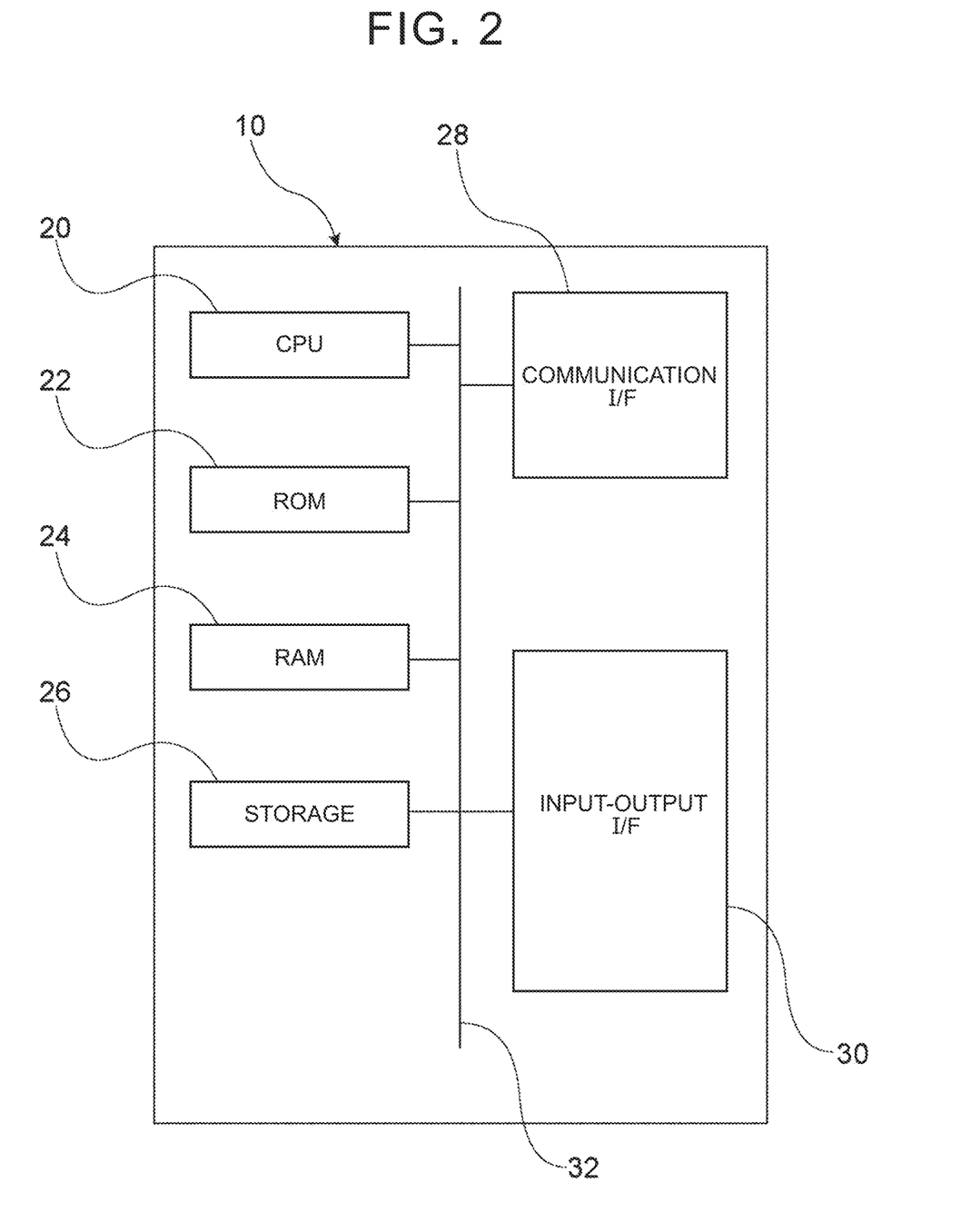
FIG. 2 is a block diagram illustrating a hardware configuration of a vehicular advertisement display device according to the embodiment.

FIG. 2 is a block diagram illustrating a hardware configuration of a vehicular advertisement display device. As illustrated in FIG. 2, the vehicular advertisement display device 10 is configured to include a Central Processing Unit (CPU (processor)) 20, a Read Only Memory (ROM) 22, Random Access Memory (RAM) 24, a storage 26, and a communication interface (a communication I/F) 28 and an input/output interface (including an input/output I/F) 30). Each configuration is communicably connected to each other via a bus 32.

CPU 20 is a central processing unit that executes various programs and controls each unit. That is, CPU 20 reads the program from ROM 22 or the storage 26, and executes the program using RAM 24 as a working area. In addition, CPU 20 performs control of the above-described configurations and various arithmetic processes in accordance with programs recorded in ROM 22 or the storage 26.

ROM 22 stores various programs and various data. RAM 24 is a non-transitory recording medium that temporarily stores programs/data as a working area. The storage 26 is a non-transitory recording medium configured by Hard Disk Drive (HDD) or Solid State Drive (SSD) and storing various programs including an operating system and various types of data. In the present embodiment, the storage 26 stores programs for performing display stop processing and luminance change processing, various data, and the like.

The communication I/F 28 is an interface for the vehicular advertisement display device 10 to communicate with the servers 12 and other devices, and standards such as Controller Area Network (CAN, Ethernet (Long Term Evolution (LTE), Fiber Distributed Data Interface (FDDI, and Wi-Fi (registered trademark) are used.

Figure 3:
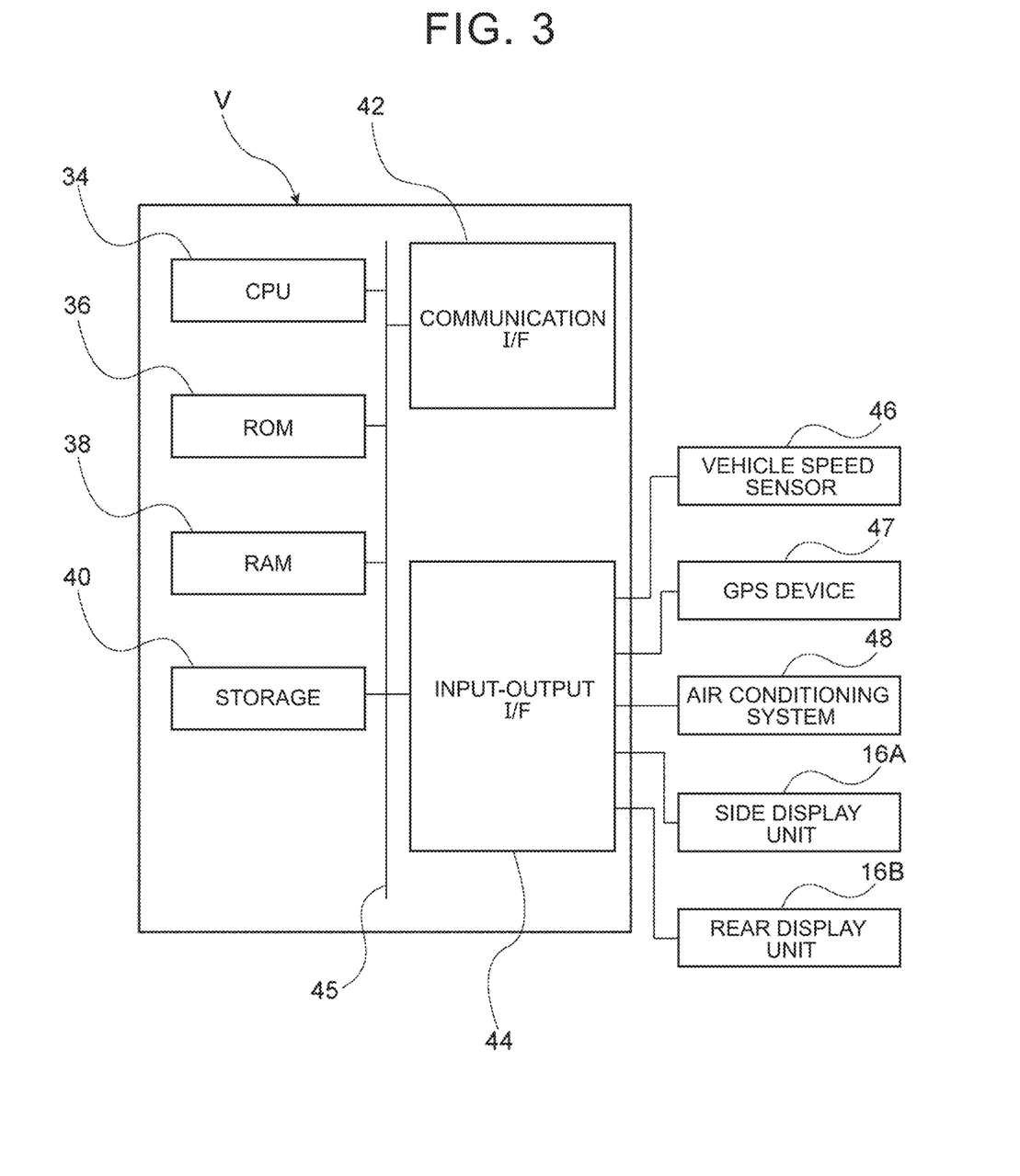
FIG. 3 is a block diagram illustrating a hardware configuration of a vehicle according to the embodiment.

The input/output I/F 30 is an interface through which the vehicular advertisement display device 10 performs input/output with the surrounding devices.
Hardware Configuration of Vehicle V FIG. 3 is a block diagram illustrating a hardware configuration of the vehicle V. As illustrated in FIG. 3, the vehicle V includes a Central Processing Unit (CPU (processor) 34, a Read Only Memory (ROM) 36, Random Access Memory (RAM) 38, a storage 40, and a communication interface (including a communication I/F) 42 and an input/output interface (an input/output I/F) 44). The components are communicably connected to each other via a bus 45.

CPU 34 is a central processing unit that executes various programs and controls each unit. That is, CPU 34 reads the program from ROM 36 or the storage 40, and executes the program using RAM 38 as a working area. In addition, CPU 34 performs control of the above-described configurations and various arithmetic processes in accordance with programs recorded in ROM 36 or the storage 40.

ROM 36 stores various programs and various data. RAM 38 is a non-transitory recording medium that temporarily stores programs/data as a working area. The storage 40 is a non-transitory recording medium configured by Hard Disk Drive (HDD) or Solid State Drive (SSD) and storing various programs including an operating system and various types of data. In the present embodiment, the storage 40 stores advertisement information and the like downloaded from the server 12.

The communication I/F 42 is an interface for the vehicle V to communicate with the vehicular advertisement display device 10, the server 12, and other devices, and standards such as Controller Area Network (CAN, Ethernet (Long Term Evolution (LTE), Fiber Distributed Data Interface (FDDI, and Wi-Fi (registered trademark) are used.

The input/output I/F 30 is electrically connected to a vehicle speed sensor 46 Global Positioning System (GPS) device 47, an air conditioning device 48, a side surface display unit 16A, and a back surface display unit 16B.

The vehicle speed sensor 46 is a sensor that is mounted on the vehicle V and detects the speed of the vehicle V. GPS device 47 is a device that receives GPS signals from a plurality of GPS satellites to determine the present position of the vehicles V.

The air conditioning device 48 is provided in the vehicle V, and is a device that blows the temperature-controlled air into the vehicle cabin. As an example, the air conditioning device 48 of the present embodiment adjusts the temperature of the air taken from the outside of the vehicle based on the vehicle cabin temperature set by the occupant, and blows air into the vehicle cabin by a fan or the like to bring the temperature in the vehicle cabin close to the set temperature.

As described above, the side surface display unit 16A is provided on both sides of the vehicle main body 14 in the vehicle widthwise direction, and includes a liquid crystal display, an organic Electro-Luminescence (EL display, and the like. Further, the back surface display unit 16B is provided on a rear surface of the vehicle main body 14 in the vehicle front-rear direction, and is configured to include a liquid crystal display, an organic EL display, and the like, similarly to the side surface display unit 16A.

Here, in the present embodiment, on the side surface display unit 16A and the back surface display unit 16B, the advertisement information are displayed independently of each other. In other words, the side surface display unit 16A and the back surface display unit 16B are configured to be able to display different types of advertisement information. In addition, the side surface display unit 16A is configured so that the side surface display unit 16A of the right side surface and the side surface display unit 16A of the left side surface of the vehicle main body 14 can display advertisement information differently.

Further, in the present embodiment, the side surface display unit 16A and the back surface display unit 16B are configured to be capable of stopping the display of the advertisement information on some of the left and right side surface display units 16A and the back surface display unit 16B. For example, the display of the advertisement information on the side surface display unit 16A of the right side surface of the vehicle main body 14 can be stopped, and the advertisement information can be displayed on the two display units of the side surface display unit 16A of the left side surface and the back surface display unit 16B.

Furthermore, in the present embodiment, the side surface display unit 16A and the back surface display unit 16B can change the luminance of some of the left and right side surface display units 16A and the back surface display unit 16B. For example, it is possible to reduce the luminance only on the side surface display unit 16A on the right side surface of the vehicle main body 14.

Further, as an example, the vehicle V of the present embodiment is equipped with a navigation system, and is configured to guide a route from a current position of the vehicle V to a destination by inputting a destination by an occupant. The route is guided by displaying the route on a monitor (not shown) provided in the vehicle cabin.

(Functional Configuration of Vehicular Advertisement Display Device 10)

The vehicular advertisement display device 10 realizes various functions using the hardware resources illustrated in FIG. 2. A functional configuration realized by the vehicular advertisement display device 10 will be described with reference to FIG. 4.

Figure 4:
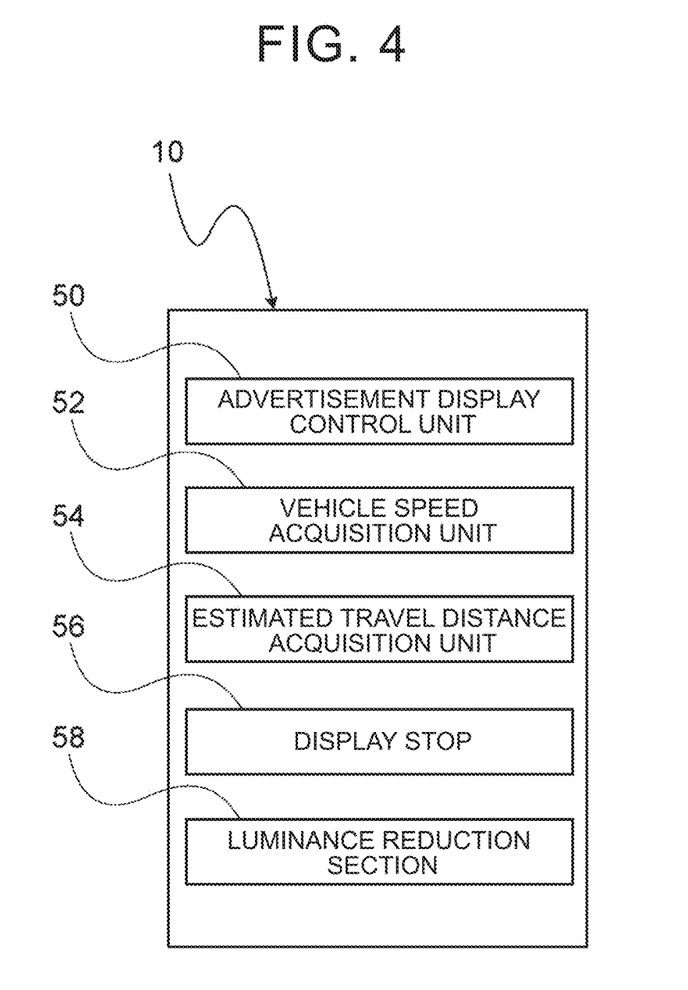
FIG. 4 is a block diagram illustrating a functional configuration of the vehicular advertisement display device according to the embodiment.

As illustrated in FIG. 4, the vehicular advertisement display device 10 includes, as functional components, an advertisement display control unit 50, a vehicle speed acquiring unit 52, a scheduled traveling distance acquiring unit 54, a display stop unit 56, and a luminance reduction unit 58. The respective functional configurations are realized by CPU 20 reading and executing a program stored in ROM 22 or the storage 26.

The advertisement display control unit 50 causes the side surface display unit 16A and the back surface display unit 16B of the vehicle V to display predetermined advertisement information. Specifically, when receiving the advertisement, the advertisement display control unit 50 acquires advertisement information from the server 12 and transmits the advertisement information to the vehicle V, thereby causing the side surface display unit 16A and the back surface display unit 16B to display the advertisement information.

When the advertisement information is stored in the storage 40 of the vehicle V or the like, the advertisement display control unit 50 may cause the advertisement information stored in the storage 40 to be displayed on the side surface display unit 16A and the back surface display unit 16B.

The vehicle speed acquiring unit 52 acquires information on the speed of the vehicle V. Specifically, the vehicle speed acquiring unit 52 acquires information detected by the vehicle speed sensor 46 from the vehicle V.

The scheduled traveling distance acquiring unit 54 acquires information on the scheduled traveling distance of the vehicle V. Specifically, the scheduled traveling distance acquiring unit 54 acquires information on the destination set in the navigation system mounted on the vehicle V and information on the present location of the vehicle V positioned by GPS device 47. Then, the scheduled traveling distance acquiring unit 54 acquires the scheduled traveling distance by calculating the traveling distance from the current position of the vehicle V to the destination.

The display stop unit 56 stops the display of the advertisement information based on the vehicle state of the vehicle V. Specifically, the display stop unit 56 stops the display of the advertisement information based on at least one of the information on the speed of the vehicle V acquired by the vehicle speed acquiring unit 52 and the information on the destination acquired by the scheduled traveling distance acquiring unit 54. Therefore, the display stop unit 56 functions as a power consumption reduction unit that reduces the power consumption of the vehicle V based on the vehicle state of the vehicle V.

The luminance reduction unit 58 stops the display of the advertisement information based on the vehicle state of the vehicle V. Specifically, the display stop unit 56 stops the display of the advertisement information based on at least one of the information on the speed of the vehicle V acquired by the vehicle speed acquiring unit 52 and the information on the destination acquired by the scheduled traveling distance acquiring unit 54. Therefore, the display stop unit 56 functions as a power consumption reduction unit that reduces the power consumption of the vehicle V based on the vehicle state of the vehicle V.

Hereinafter, an example in which the display stop unit 56 and the luminance reduction unit 58 reduce the power consumption of the vehicle V will be described.

When the vehicle speed of the vehicle V acquired by the vehicle speed acquiring unit 52 is smaller than a preset first threshold value, the display stop unit 56 does not stop displaying the advertisement information. That is, when the vehicle speed of the vehicle V is smaller than the first threshold value, the advertisement information is displayed on the side surface display unit 16A and the back surface display unit 16B.

When the vehicle speed of the vehicle V acquired by the vehicle speed acquiring unit 52 is equal to or higher than the preset first threshold value, the display stop unit 56 temporarily stops the display of a part of the advertisement information displayed on the side surface display unit 16A and the back surface display unit 16B. For example, when the vehicle speed is equal to or higher than the first threshold value, the display stop unit 56 stops the display of the advertisement information displayed on the side surface display unit 16A, thereby reducing the power consumed. At this time, the back surface display unit 16B maintains that the advertisement information is displayed. When the vehicle speed of the vehicle V is shifted to a state smaller than the first threshold value, the stop state of the display by the display stop unit 56 is released, and the display of the advertisement information on the side surface display unit 16A is resumed.

When the vehicle speed of the vehicle V acquired by the vehicle speed acquiring unit 52 is equal to or higher than the second threshold value set in advance, the display stop unit 56 stops the display of all the advertisement information displayed on the side surface display unit 16A and the back surface display unit 16B. Here, the second threshold value is set to a value larger than the first threshold value, and the second threshold value is set to a speed at which a person around the vehicle V cannot sufficiently gaze at the side surface display unit 16A and the back surface display unit 16B. When the vehicle speed of the vehicle V shifts to a state smaller than the second threshold value, the stop state of the display by the display stop unit 56 is released, and the display of the advertisement information on the back surface display unit 16B is resumed. Even in this case, when the vehicle speed of the vehicle V is equal to or higher than the first threshold value, the display of the advertisement information on the side surface display unit 16A is stopped.

Further, when the scheduled traveling distance acquired by the scheduled traveling distance acquiring unit 54 is equal to or greater than the predetermined first distance, the display stop unit 56 stops the display of a part of the advertisement information displayed on the side surface display unit 16A and the back surface display unit 16B, thereby reducing the power consumed. For example, when the scheduled traveling distance is equal to or greater than the first distance, the display stop unit 56 stops the advertisement information displayed on the side surface display unit 16A, thereby reducing the power consumed.

When the scheduled traveling distance is equal to or greater than the predetermined second distance, the display stop unit 56 stops the display of all the advertisement information displayed on the side surface display unit 16A and the back surface display unit 16B. The second distance is set to a value larger than the first distance.

When the vehicle speed of the vehicle V acquired by the vehicle speed acquiring unit 52 is smaller than the third threshold value set in advance, the luminance reduction unit 58 does not reduce the luminance of the display of the advertisement information. That is, when the vehicle speed of the vehicle V is smaller than the third threshold value, the advertisement information displayed on the side surface display unit 16A and the back surface display unit 16B is not changed from the luminance of the default value.

When the vehicle speed of the vehicle V acquired by the vehicle speed acquiring unit 52 is equal to or higher than the third threshold value set in advance, the luminance reduction unit 58 temporarily lowers the luminance of a part of the side surface display unit 16A and the back surface display unit 16B. For example, when the vehicle speed is equal to or higher than the third threshold value, the luminance reduction unit 58 reduces the luminance of the side surface display unit 16A, thereby reducing the power consumed. At this time, the luminance of the back surface display unit 16B is not changed. When the vehicle speed of the vehicle V shifts to a state smaller than the third threshold value, the change of the luminance by the luminance reduction unit 58 is canceled, and the luminance of the side surface display unit 16A is returned to the default value.

When the vehicle speed of the vehicle V acquired by the vehicle speed acquiring unit 52 is equal to or higher than the fourth threshold value set in advance, the luminance reduction unit 58 lowers the luminance of both the side surface display unit 16A and the back surface display unit 16B. Here, the fourth threshold is set to a value larger than the third threshold. When the vehicle speed of the vehicle V shifts to a state smaller than the fourth threshold value, the change of the luminance by the luminance reduction unit 58 is canceled, and the luminance of the back surface display unit 16B is returned to the default value. Even in this case, when the vehicle speed of the vehicle V is equal to or higher than the third threshold value, the luminance of the side surface display unit 16A remains low. The relationship between the first threshold value and the third threshold value and the magnitude relationship between the second threshold value and the fourth threshold value are not particularly limited.

Further, when the scheduled traveling distance acquired by the scheduled traveling distance acquiring unit 54 is equal to or greater than a predetermined third distance, the luminance reduction unit 58 reduces the luminance of a part of the display units among the side surface display unit 16A and the back surface display unit 16B to reduce the power consumed. For example, when the estimated travel distance is equal to or greater than the third distance, the display stop unit 56 reduces the luminance of the side surface display unit 16A to reduce the power consumed.

When the scheduled traveling distance is equal to or greater than the predetermined fourth distance, the luminance reduction unit 58 lowers the luminance of both the side surface display unit 16A and the back surface display unit 16B. Here, the fourth distance is set to a value larger than the third distance. The relationship between the first distance and the third distance and the magnitude relationship between the second distance and the fourth distance are not particularly limited.

Effect

Next, the effect of the present embodiment will be described.

Example of Display Stop Processing

Figure 5:
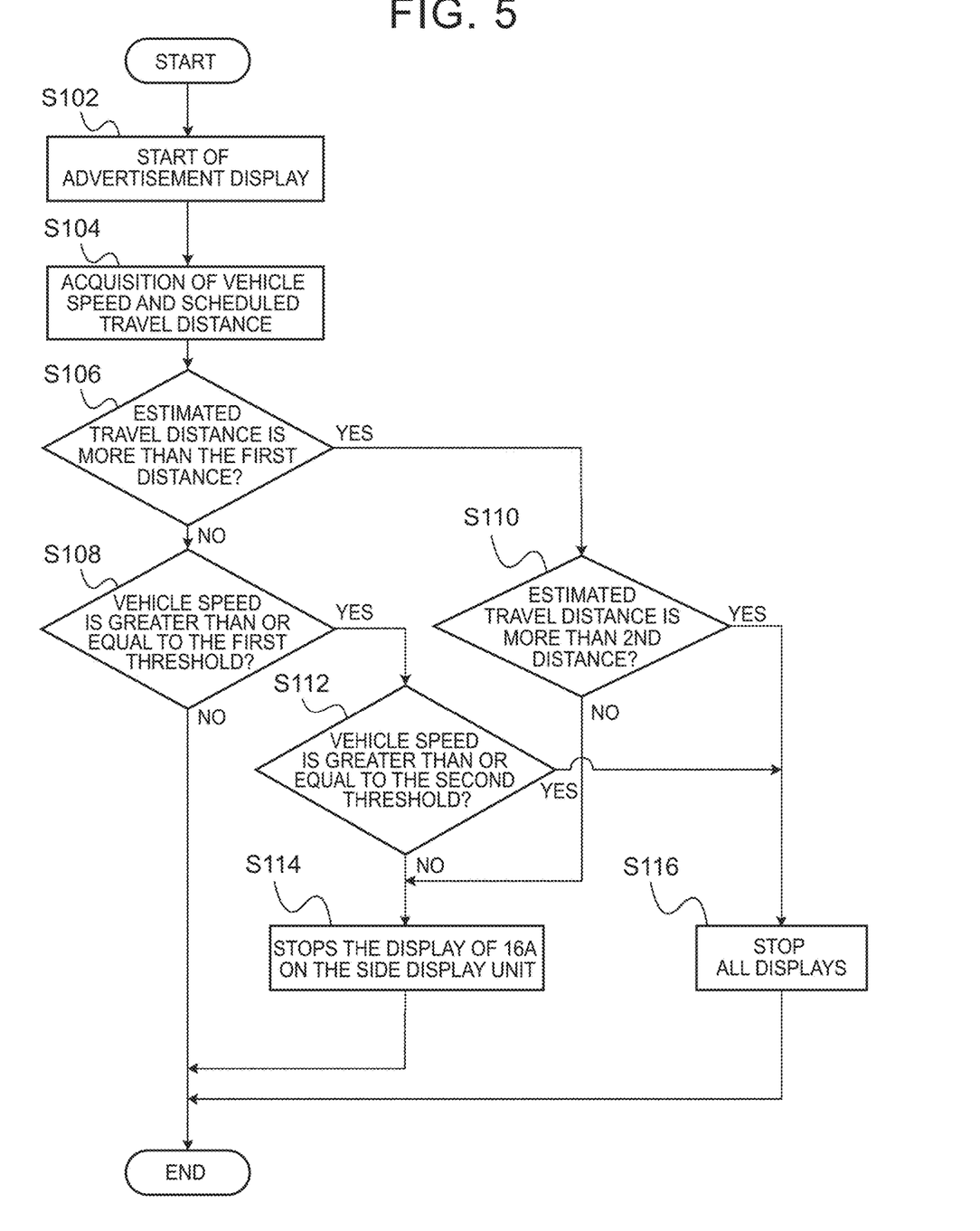
FIG. 5 is a flowchart illustrating an example of a flow of a display stop process according to the embodiment.

FIG. 5 is a flowchart illustrating an example of a flow of a display stop process performed by the vehicular advertisement display device 10 according to the present embodiment. This advertising displaying process is executed by CPU 20 reading the program from the storage 26 and expanding the program in RAM 24.

As shown in FIG. 5, CPU 20 starts displaying the advertisement information in the step-wise S102. Specifically, CPU 20 displays an advertisement on the side surface display unit 16A and the back surface display unit 16B of the vehicle V by the function of the advertisement display control unit 50. The content of the advertisement information to be displayed is selected, for example, based on a signal received from the outside.

CPU 20 acquires the vehicle speed and the scheduled travel distance in the stepwise S104. Specifically, CPU 20 acquires vehicle speed information by the function of the vehicle speed acquiring unit 52. Further, CPU 20 acquires information on the scheduled travel distance by the function of the scheduled traveling distance acquiring unit 54.

CPU 20 determines whether or not the planned traveling distance is equal to or greater than the first distance in the stepwise S106. When the scheduled traveling distance acquired by the scheduled traveling distance acquiring unit 54 is equal to or greater than the first distance, CPU 20 proceeds to the process of the step S110. In addition, when the scheduled traveling distance is smaller than the first distance, CPU 20 proceeds to the process of the step S108. First, the processing after the step S108 will be described, and the processing after the step S110 will be described later.

CPU 20 determines whether or not the vehicle speed is equal to or higher than the first thresholds in the stepwise S108. When the vehicle speed of the vehicle V acquired by the vehicle speed acquiring unit 52 is equal to or higher than the first threshold, CPU 20 proceeds to the process of the step S112. When the vehicle speed of the vehicle V is smaller than the first threshold, CPU 20 ends the display-stopping process. That is, CPU ends the display stopping process without stopping the display of the advertisement information when the scheduled traveling distance is smaller than the first distance and the vehicle speed is smaller than the first threshold.

On the other hand, if it is determined in step S108 that the vehicle speed of the vehicle V is equal to or greater than the first threshold value, CPU 20 determines in step S112 whether the vehicle speed is equal to or greater than the second threshold value. When the vehicle speed of the vehicle V is equal to or higher than the second threshold value, CPU proceeds to the process of the step S116. When the vehicle speed of the vehicle V is smaller than the second threshold, CPU 20 proceeds to the process of the step S114.

CPU 20 temporarily stops the display of the side surface display unit 16A in the process of the step S114. Specifically, CPU 20 stops the display of the advertisement information in the side surface display unit 16A provided on the right side surface and the left side surface of the vehicle main body 14 by the function of the display stop unit 56. Then, CPU 20 ends the display-stopping process. That is, when the scheduled traveling distance is smaller than the first distance and the vehicle speed is between the first threshold value and the second threshold value, CPU 20 stops the display of the side surface display unit 16A only and ends the display stop process.

When the scheduled traveling distance is equal to or greater than the first distance in the step S106, CPU 20 proceeds to the process of the step S110 to determine whether the scheduled traveling distance is equal to or greater than the second distance. When the scheduled traveling distance acquired by the scheduled traveling distance acquiring unit 54 is equal to or greater than the second distance, CPU 20 proceeds to the process of the step S116. In addition, when the scheduled traveling distance is smaller than the second distance, CPU 20 proceeds to the process of the step S114 and temporarily stops the display of the side surface display unit 16A.

CPU 20 shifts to the process of the step S116 and stops all the displays when it is determined in the step S110 that the scheduled traveling distance is equal to or greater than the second distance and when it is determined in the step S112 that the vehicle speed of the vehicle V is equal to or greater than the second threshold. Specifically, CPU 20 stops the display of both the side surface display unit 16A and the back surface display unit 16B by the function of the display stop unit 56.

Example of Brightness Change Processing

Figure 6:
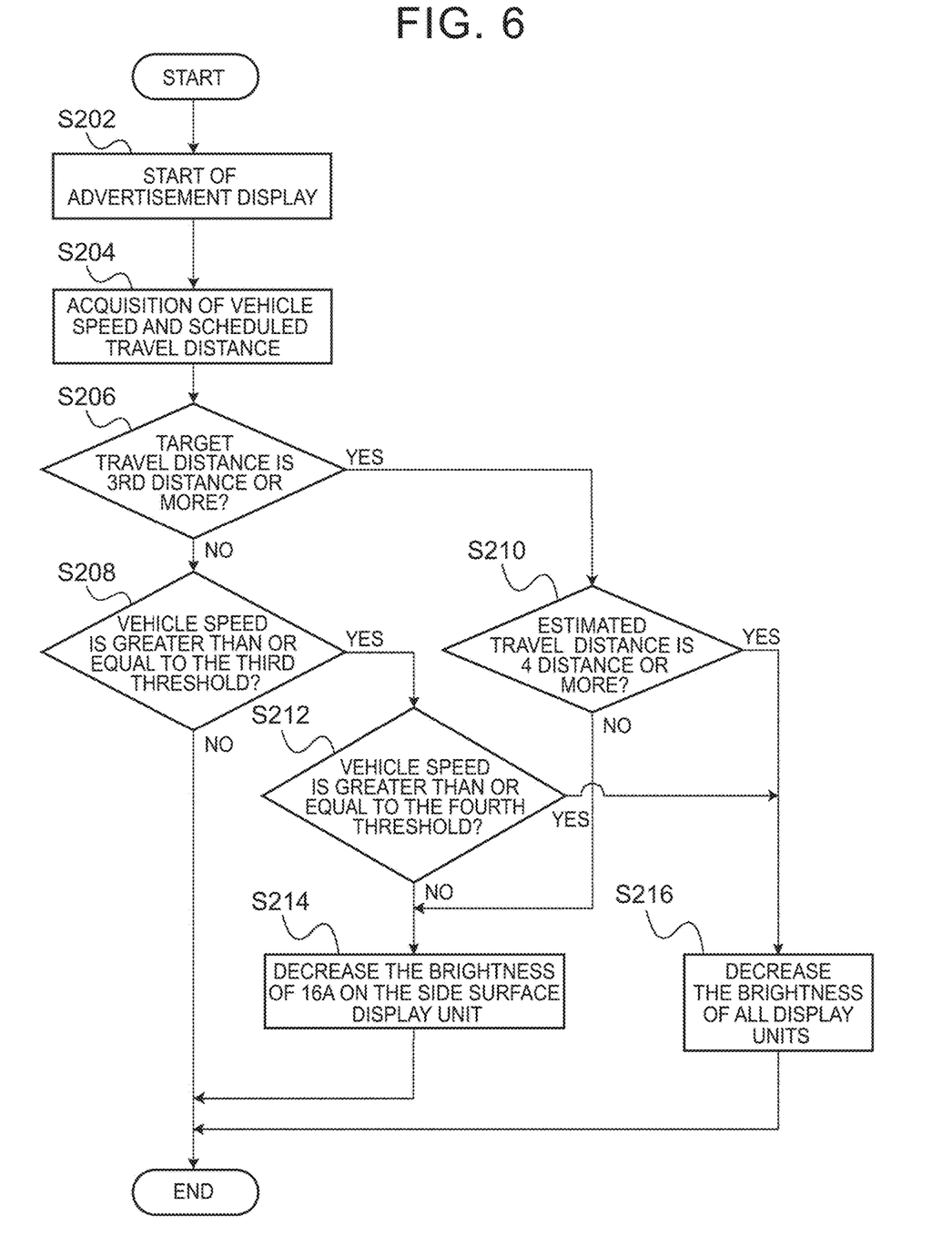
FIG. 6 is a flowchart illustrating an example of a flow of luminance change processing according to the embodiment.

FIG. 6 is a flowchart illustrating an example of a flow of luminance change processing performed by the vehicular advertisement display device 10 according to the present embodiment. This advertising displaying process is executed by CPU 20 reading the program from the storage 26 and expanding the program in RAM 24.

As shown in FIG. 6, CPU 20 starts displaying the advertisement information in the step-wise S202. Specifically, CPU 20 displays an advertisement on the side surface display unit 16A and the back surface display unit 16B of the vehicle V by the function of the advertisement display control unit 50. The content of the advertisement information to be displayed is selected, for example, based on a signal received from the outside.

CPU 20 acquires the vehicle speed and the scheduled travel distance in the stepwise S204. Specifically, CPU 20 acquires vehicle speed information by the function of the vehicle speed acquiring unit 52. Further, CPU 20 acquires information on the scheduled travel distance by the function of the scheduled traveling distance acquiring unit 54.

CPU 20 determines whether or not the planned traveling distance is equal to or greater than the third distance in the stepwise S206. When the scheduled traveling distance acquired by the scheduled traveling distance acquiring unit 54 is equal to or greater than the third distance, CPU 20 proceeds to the process of the step S210. In addition, when the scheduled traveling distance is smaller than the third distance, CPU 20 proceeds to the process of the step S208. First, the processing after the step S208 will be described, and the processing after the step S210 will be described later.

CPU 20 determines whether or not the vehicle speed is equal to or higher than the third threshold in the step S208. When the vehicle speed of the vehicle V acquired by the vehicle speed acquiring unit 52 is equal to or higher than the third threshold, CPU 20 proceeds to the process of the step S212. When the vehicle speed of the vehicle V is smaller than the third threshold, CPU 20 ends the luminance change process. That is, when the scheduled traveling distance is smaller than the third distance and the vehicle speed is smaller than the third threshold, CPU 20 ends the luminance change process without changing the luminance of the display unit.

On the other hand, if it is determined in step S208 that the vehicle speed of the vehicle V is equal to or greater than the third threshold value, CPU 20 determines in step S212 whether the vehicle speed is equal to or greater than the fourth threshold value. When the vehicle speed of the vehicle V is equal to or higher than the fourth threshold value, CPU proceeds to the process of the step S216. When the vehicle speed of the vehicle V is smaller than the fourth threshold, CPU 20 proceeds to the process of the step S214.

CPU 20 temporarily lowers the luminance of the side surface display unit 16A in the process of the step-wise S214. Specifically, CPU 20 lowers the luminance of the side surface display unit 16A provided on the right side surface and the left side surface of the vehicle main body 14 by the function of the luminance reduction unit 58. Then, CPU 20 ends the luminance change process. That is, when the scheduled traveling distance is smaller than the third distance and the vehicle speed is between the third threshold value and the fourth threshold value, CPU 20 lowers only the luminance of the side surface display unit 16A and ends the luminance change process.

When the scheduled traveling distance is equal to or greater than the third distance in the step S206, CPU 20 proceeds to the process of the step S210 to determine whether the scheduled traveling distance is equal to or greater than the fourth distance. When the scheduled traveling distance acquired by the scheduled traveling distance acquiring unit 54 is equal to or greater than the fourth distance, CPU 20 proceeds to the process of the step S216. In addition, when the scheduled traveling distance is smaller than the fourth distance, CPU 20 proceeds to the process of the step-wise S214, and temporarily lowers the luminance of the side surface display unit 16A.

CPU 20 shifts to the process of the step S216 and lowers the luminance of all the display units when it is determined that the travel scheduled distance is equal to or greater than the fourth distance in the step S210 and when it is determined that the vehicle speed of the vehicle V is equal to or greater than the fourth threshold in the step S212. Specifically, CPU 20 lowers the luminance of both the side surface display unit 16A and the back surface display unit 16B by the function of the luminance reduction unit 58.

As described above, in the vehicular advertisement display device 10 according to the present embodiment, advertisement information is displayed on the side surface display unit 16A and the back surface display unit 16B provided on the outer surface of the vehicle main body 14, so that the advertisement can be visually recognized by persons around the vehicle V. In addition, CPU 20 reduces the power consumption of the vehicle V based on the vehicle status, so that the vehicle V can travel for a longer time than a configuration that does not consider the power consumption.

In addition, in the present embodiment, CPU 20 is configured to reduce power consumed for displaying the advertisement information when the vehicle speed is higher than the predetermined speed. When the vehicle speed is high, since a person around the vehicle V cannot watch the advertisement information, there is a high possibility that the effect of displaying the advertisement information cannot be sufficiently obtained. Therefore, by reducing the power consumption related to the display of the advertisement information when the vehicle speed is high, the electric power used for the display of the advertisement information can be used for the traveling of the vehicle.

Further, in the present embodiment, when the distance to the destination is longer than the predetermined distance, CPU 20 reduces the power consumed by displaying. Therefore, it is possible to suppress the fuel from being lost to the destination.

In particular, in the present embodiment, the display stop unit 56 temporarily stops the display of the advertisement information on a part of the display units of the side surface display unit 16A and the back surface display unit 16B, so that it is possible to reduce the power consumed for the display of the advertisement information only while the display is stopped.

At this time, in the present embodiment, CPU 20 preferentially stops the display of the advertisement information on the side surface display unit 16A with respect to the back surface display unit 16B. As a result, the advertisement information on the back surface display unit 16B is easily maintained in the displayed condition, so that it is possible to provide the advertisement information to the occupant of the succeeding vehicle traveling behind the vehicle V even when the vehicle is traveling at a certain velocity.

Further, the luminance reduction unit 58 temporarily lowers the luminance of the display of the advertisement information in some of the display units of the side surface display unit 16A and the back surface display unit 16B, so that the power consumed for the display of the advertisement information can be reduced only while the luminance is lowered. In this case, since the display of the advertisement information is not stopped, it is possible to reduce the power consumption while displaying the advertisement.

Although the vehicular advertisement display device 10 according to the embodiment and the modification has been described above, it is needless to say that the present disclosure can be implemented in various forms without departing from the gist of the present disclosure. For example, in the above embodiment, the configuration in which the power consumption of the vehicle V is reduced by the functions of the display stop unit 56 and the luminance reduction unit 58 has been described, but the present disclosure is not limited thereto, and the power consumption of the vehicle V may be reduced by other functions.

For example, the vehicle V may further include a function of an air-conditioning control unit that controls the air conditioning device 48 of the vehicle V, and the air-conditioning control unit may reduce the power consumption of the vehicle V. The air-conditioning control unit may reduce the power consumption of the vehicle V by temporarily stopping or weakening the air-conditioning function of the air conditioning device 48 when the scheduled traveling distance to the destination of the vehicle V is equal to or more than a predetermined distance. Specifically, in a situation where the air conditioning device 48 may be stopped, such as in a case where the temperature difference between the outside air and the vehicle cabin is small, by temporarily stopping the air conditioning device 48 by the air conditioning control unit, the electric power consumed by the air conditioning device 48 can be used for traveling. Further, in a case where the temperature difference between the outside air and the inside of the vehicle cabin is large, by changing the set temperature so as to approach the outside air temperature by the function of the air-conditioning control unit, it is possible to reduce the power consumption by the air conditioning device 48.

As another example, the power consumption may be reduced by stopping the process of a part of CPU 34 with respect to CPU 34 of the vehicles V. By stopping a function that is not required for traveling of the vehicle V, CPU 34 process loads are reduced, and consequently, the power consumed by the vehicle V can be reduced.

Further, in the above-described embodiment, the display is stopped or the luminance of the display unit is reduced on the basis of the vehicle speed and the travel scheduled distance, but the configuration is not limited thereto. For example, the display unit may be stopped or the luminance may be reduced based on a vehicle state such as the number of occupants and the load amount of the cargo. When the number of passengers and the load amount of the cargo are large, a larger amount of energy is required for traveling of the vehicle V. In such cases, by stopping the display of the side surface display unit 16A and the back surface display unit 16B, the electric power required for the display of the advertisement information can be used for the traveling of the vehicles V. In this way, it is possible to allocate the use ratio of the energy according to the priority order of displaying the advertisement information and expanding the cruising distance.

Further, in the display stop process of the above-described embodiment, the display of the side surface display unit 16A is stopped when the vehicle speed is equal to or greater than the first threshold value and smaller than the second threshold value, and the display of all the display units is stopped when the vehicle is equal to or greater than the second threshold value, but the display stop process is not limited thereto. For example, the display of the back surface display unit 16B may be stopped when the vehicle speed is equal to or higher than the first threshold value and lower than the second threshold value. In addition, when the vehicle is equal to or larger than the first threshold value, the display of all the display units may be stopped. Further, a configuration may be adopted in which the first index value corresponding to the vehicle speed and the second index value corresponding to the scheduled traveling distance are set, and the display of the display unit is stopped in accordance with the total value of the first index value and the second index value.

Similar to the display stop process, in the luminance change process, the display of the display unit may be stopped in accordance with the total value of the first index value and the second index value. In addition, the occupant may be allowed to select whether to perform the display stop process or the luminance change process.

Furthermore, in the above embodiment, the configuration in which the vehicular advertisement display device 10 is provided outside the vehicle V has been described, but the present disclosure is not limited thereto. For example, the vehicular advertisement display device 10 may be mounted on the vehicle V.

Further, a process executed by CPU 20 reading the program in the above-described embodiment may be executed by various processors other than CPU 20. Examples of the processor include a Programmable Logic Device (PLD in which a circuit configuration can be changed after manufacturing of Field-Programmable Gate Array (FPGA, and the like, and a dedicated electric circuit that is a processor having a circuit configuration designed exclusively for executing a particular process such as Application Specific Integrated Circuit (ASIC, and the like. In addition, each process may be executed by one of these various processors, or may be executed by a combination of two or more processors of the same kind or different kinds. For example, the processes may be executed by a plurality of FPGAs, a combination of the CPU and the FPGA, and the like. The hardware structure of these various processors is, more specifically, an electric circuit in which circuit elements such as semiconductor elements are combined.

In the above-described embodiment, the programs are stored (installed) in advance in a non-transitory computer-readable recording medium, but the present disclosure is not limited thereto, and the programs may be provided in a form recorded in a non-transitory recording medium such as Compact Disc Read Only Memory (CD-ROM), Digital Versatile Disc Read Only Memory (DVD-ROM), and Universal Serial Bus (USB). Further, the program may be downloaded from an external device via a network.

Further, the flow of the processing described in the above embodiment is an example, and unnecessary steps may be deleted, new steps may be added, or the processing order may be changed within a range not departing from the gist.

What is claimed is:
1. A vehicular advertisement display device comprising a processor, wherein the processor is configured to:
  display advertisement information on a side surface display unit provided on an outer surface of a vehicle main body in a vehicle widthwise direction and a back surface display unit provided on an outer surface of the vehicle main body in a vehicle front-rear direction;
  reduce power consumption of a vehicle based on a vehicle state;
  reduce power consumption related to display of the advertisement information on the display unit on the side surface of the vehicle when a vehicle speed serving as the vehicle state is higher than a predetermined first threshold speed; and
  reduce power consumption related to display of the advertisement information displayed on the display unit on the side surface of the vehicle and the display unit on the back surface of the vehicle when the vehicle speed servicing as the vehicle state is higher than a predetermined second threshold speed, wherein the predetermined second threshold speed is higher than the predetermined first threshold speed.

2. The vehicular advertisement display device according to claim 1, wherein the processor is configured to reduce power consumption related to display of the advertisement information when a distance to a destination set as the vehicle state is longer than a predetermined distance.

3. A vehicle comprising:
  the vehicle main body provided with the display unit on the side surface and the display unit on the back surface; and
  the vehicular advertisement display device according to claim 1.

4. The vehicular advertisement display device according to claim 1, wherein the processor is configured to reduce power consumption related to the display unit on the side surface or the display unit on the back surface by temporarily stopping display of the advertisement information.

5. The vehicular advertisement display device according to claim 1, wherein the processor is configured to reduce power consumption related to the display unit on the side surface or the display unit on the back surface by temporarily decreases a luminance of display of the advertisement information.

* * * * *